J. HAWKINS.
Gridiron.

No. 3,973.

Patented March 26, 1845.

UNITED STATES PATENT OFFICE.

JOSEPH HAWKINS, OF WEST WINDSOR, NEW JERSEY.

GRIDIRON.

Specification of Letters Patent No. 3,973, dated March 26, 1845.

*To all whom it may concern:*

Be it known that I, JOSEPH HAWKINS, of West Windsor, in the county of Mercer and State of New Jersey, have invented a new and useful Gridiron for Broiling; and I do hereby declare that the following is a description thereof, reference being had to the annexed drawings of the same, making part of this specification.

Figure 1:
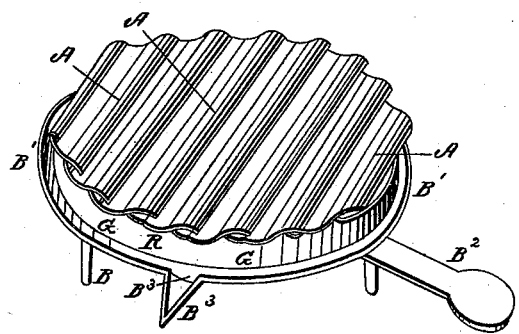
Figure 3:
Figure 2:
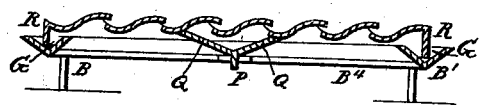

Figure 1 is a perspective view of the gridiron. Fig. 2 is a sectional view of the same. Fig. 3 is a sectional view of the double grates or bars of the cavetto and ovolo shaped bars of a gridiron.

The gridiron in its general outline may be made round or square or of any shape required, and of wrought or cast iron or any suitable material. I place a number of concavo convex or cima recta shaped bars A parallel to and distant from, and overlapping each other, having their ends fastened to a revolving circular rim R turning in a circular trough G of the stand B said stand being provided with a handle $B^2$ and spout $B^3$ to discharge the gravy into a receiver—the revolving part of the gridiron A being provided with a pivot P fastened to the center thereof by oblique arms Q; said pivot P turning in a socket in the center of a horizontal cross bar $B^4$ of the stand B.

The meat to be broiled is to be placed upon the said concavo convex bars A and brought over the fire—the heat passes through the spaces between the bars and cooks the meat, the gravy issuing from the meat runs over the convex surfaces of the bars into the concave surfaces by which it is conducted to the circular trough G and thence by the spout $B^3$ to the receiver. By this arrangement all the liquid which falls from the meat during the process of cooking is saved, while at the same time the bars are sufficiently open to allow the heat to pass between them to cook the meat in a perfect manner—at the same time preventing any gravy or juice falling upon the fire to burn and create a smoke beneath the meat and destroy its flavor.

The circular trough G for catching the gravy is formed in the upper surface of a circular plate B′ having legs by which it is supported above the fire and having a spout $B^3$ for discharging the gravy into a receiver.

When I make the gridiron of a square form I lengthen or elevate the front feet slightly and have a receiver at the handle into which the gravy runs from the bars which bars may be constructed as before described—or other way producing the same result. Or the same end may be obtained by using alternate ovolo and cavetto shaped bars as is represented at A′ $A^2$ in Fig. 3, the lower range of cavetto shaped bars A′ are turned up at each edge so as to form a groove for conveying the gravy, the upper range of ovolo bars $A^2$, on which the meat rests when cooking are turned down at each edge so that nothing liquid will remain upon them and the two ranges being placed in such relation to each other that fat or gravy falling from the upper will be caught by the lower bars, and conveyed to a trough supported on suitable legs above the fire.

What I claim as my invention and desire to secure by Letters Patent is—

The construction and arrangement of the bars for the purpose of saving all the gravy as herein set forth whether constructed in the precise manner above described or in other mode substantially the same by which analogous results are produced.

JOSEPH HAWKINS.

Signed in the presence of us this seventeenth day of March A. D. 1845.

ANN E. EVANS,
SAM. EVANS.